(12) United States Patent
Shi et al.

(10) Patent No.: US 9,785,016 B2
(45) Date of Patent: Oct. 10, 2017

(54) LIQUID CRYSTAL GRATING, MANUFACTURING METHOD AND DRIVE METHOD THEREOF, AND OPTICAL PHASED ARRAY DEVICE

(71) Applicant: BOE TECHNOLOGY GROUP CO., LTD., Beijing (CN)

(72) Inventors: Shiming Shi, Beijing (CN); Ling Shi, Beijing (CN); Tao Sun, Beijing (CN); Yunfei Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1 day.

(21) Appl. No.: 14/369,441

(22) PCT Filed: Dec. 19, 2013

(86) PCT No.: PCT/CN2013/089951
§ 371 (c)(1),
(2) Date: Jun. 27, 2014

(87) PCT Pub. No.: WO2015/018165
PCT Pub. Date: Feb. 12, 2015

(65) Prior Publication Data
US 2015/0042938 A1    Feb. 12, 2015

(30) Foreign Application Priority Data

Aug. 6, 2013  (CN) .......................... 2013 1 0339810

(51) Int. Cl.
*G02F 1/1343* (2006.01)
(52) U.S. Cl.
CPC .. *G02F 1/134309* (2013.01); *G02F 2201/305* (2013.01); *Y10T 29/49124* (2015.01)
(58) Field of Classification Search
CPC ........................ G02F 1/13439; G02F 1/133345
(Continued)

(56) References Cited

U.S. PATENT DOCUMENTS 6,628,347 B1 * 9/2003 Oohata ............. G02F 1/134309
349/25
2002/0080319 A1 * 6/2002 Hagiwara ............. G02F 1/1339
349/153
(Continued)

FOREIGN PATENT DOCUMENTS

CA    2766694 A1    12/2010
CN    2766694 A1    12/2010
(Continued)

OTHER PUBLICATIONS

Office Action issued in Chinese Application No. 201310339810.5 dated Jun. 1, 2015.
(Continued)

*Primary Examiner* — Lucy Chien
(74) *Attorney, Agent, or Firm* — Nath, Goldberg & Meyer; Joshua B. Goldberg; Christopher Thomas (57) ABSTRACT

The present invention discloses a liquid crystal grating, a manufacturing method and a drive method thereof, and an optical phased array. In the liquid crystal grating, plurality of first electrodes are formed on a lower substrate with first gaps formed between adjacent first electrodes, second electrodes are further provided above the first gaps with second gaps formed between adjacent second electrodes, and an insulation layer is provided between the first electrodes and the second electrodes. When voltages are applied to the first electrodes and the second electrodes, continuously and smoothly changing electric field is generated inside the liquid crystal grating, and then phases of incident light may be controlled continuously and smoothly, which improves the ability of the liquid crystal grating to modulate light beam.

14 Claims, 5 Drawing Sheets

(58) Field of Classification Search
USPC .......................................................... 349/139
See application file for complete search history.

(56) References Cited

U.S. PATENT DOCUMENTS

| | | | |
|---|---|---|---|
| 2002/0154377 A1 | 10/2002 | Pepper | |
| 2003/0112398 A1* | 6/2003 | Kim | G02F 1/134309 349/129 |
| 2006/0158576 A1* | 7/2006 | Kim | G02F 1/133707 349/38 |
| 2010/0110316 A1 | 5/2010 | Huang et al. | |
| 2012/0162592 A1* | 6/2012 | Takagi | G02B 27/2214 349/139 |
| 2012/0188498 A1* | 7/2012 | Nishino | G02F 1/1345 349/143 |
| 2012/0300042 A1* | 11/2012 | Yun | H04N 13/0404 348/51 |

FOREIGN PATENT DOCUMENTS

| | | |
|---|---|---|
| CN | 102053419 A | 5/2011 |
| CN | 102419500 A | 4/2012 |
| CN | 202306062 U | 7/2012 |
| CN | 202837755 U | 3/2013 |
| CN | 103424941 A | 12/2013 |

OTHER PUBLICATIONS

Form PCT/ISA/237 issued in International Application No. PCT/CN2013/089951 dated May 16, 2014.
Search Report issued in International Application No. PCT/CN2013/089951, thirteen (13) pages.
Office Action dated Dec. 11, 2015 issued in corresponding Chinese Application No. 201310339810.5.
Extended European Search Report dated Mar. 10, 2017 in corresponding European Application No. 13863686.5.

* cited by examiner

LIQUID CRYSTAL GRATING, MANUFACTURING METHOD AND DRIVE METHOD THEREOF, AND OPTICAL PHASED ARRAY DEVICE

This is a National Phase Application filed under 35 U.S.C. 371 as a national stage of PCT/CN2013/089951, filed Dec. 19, 2013, and claims priority benefit from Chinese Application No. 201310339810.5, filed Aug. 6, 2013, the content of each of which is hereby incorporated by reference in its entirety.

FIELD OF THE INVENTION

The present invention relates to the field of dis logy, and particularly, to a liquid crystal grating, a manufacturing method and a drive method thereof, and an optical phased array.

BACKGROUND OF THE INVENTION

Core component of a liquid crystal optical phased array (LCOPA) device is a liquid crystal grating comprising electrodes arranged in parallel, between which voltages are applied so that an electric field is formed therebetween to control rotation of liquid crystal.

Figure 1:
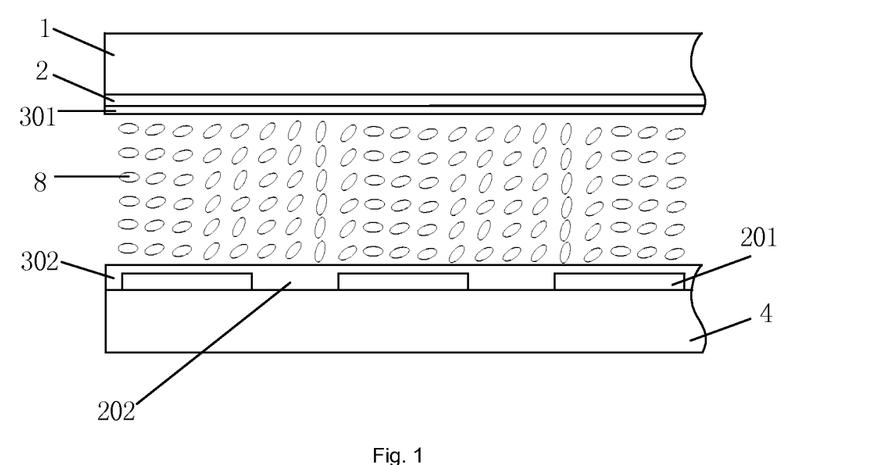
FIG. 1 is a schematic diagram of a structure of a liquid crystal grating in a LCOPA device in the prior art.
Figure 2:
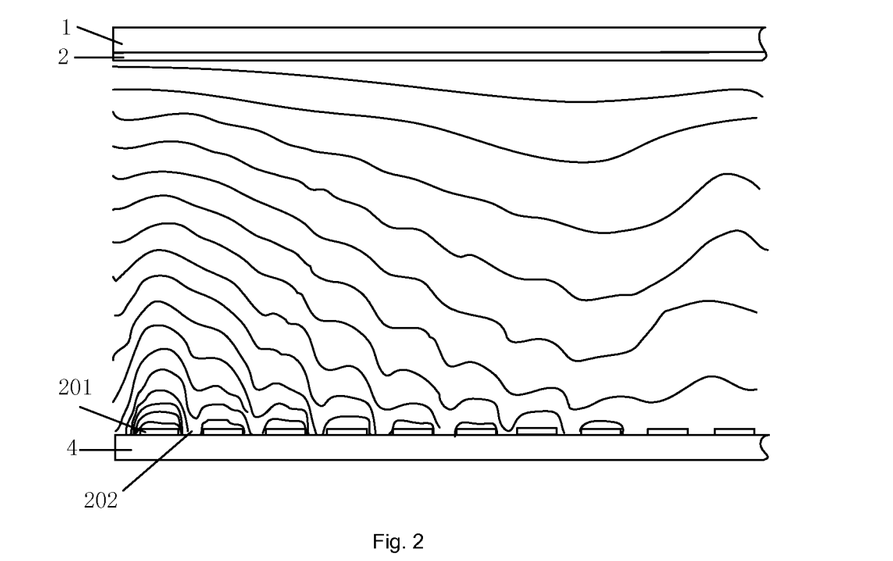
FIG. 2 is a schematic diagram of isopotential lines of electric field inside the liquid crystal grating shown in FIG. 1.
Figure 3:
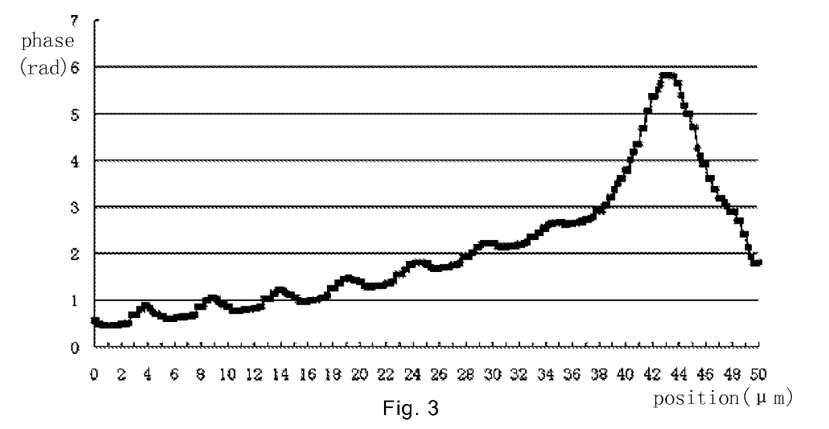
FIG. 3 is a graph illustrating phases of incident light controlled by the liquid crystal grating shown in FIG. 1.

FIG. 1 is a schematic diagram of a structure of a liquid crystal grating in a LCOPA device of the prior art, FIG. 2 is a schematic diagram of isopotential lines of the electric field inside the liquid crystal grating shown in FIG. 1, and FIG. 3 is a graph illustrating phases of incident light controlled by the liquid crystal grating shown in FIG. 1. As shown in FIG. 1, this liquid crystal grating includes: an upper substrate 1 and a lower substrate 4 provided opposite to each other, liquid crystal 8 filled between the upper substrate 1 and the lower substrate 4, a common electrode 2 formed on the upper substrate 1, and a plurality of electrodes 201 formed on the lower substrate 4, and gaps 202 are formed between adjacent electrodes 201. Further, an alignment layer 301 is further formed on the common electrode 2, and an alignment layer 302 is also formed on the electrodes 201. With voltages applied to the plurality of electrodes 201, respectively, electric fields are formed between the electrodes 201 and the common electrode 2, and the liquid crystal 8 is driven to rotate by the electric fields, thus achieving phase control on incident light. FIGS. 2 and 3 are simulation diagrams of electric fields inside the liquid crystal grating shown in FIG. 1 and controlled phases of incident light, and FIGS. 2 and 3 correspond to each other. Here, the electrodes 201 have a width of 3 μm, the gaps 202 have a width of 2 μm, liquid crystal cell has a thickness of 5 μm, and voltages gradually decrease from left end to right end. In FIG. 3, only changes in phases of incident light corresponding to a first 50 μm from left end of the liquid crystal grating are depicted. It should be noted that FIG. 2 is merely a schematic diagram simulating the inner electric field, and the ratio of length to width of the liquid crystal grating in FIG. 2 is not to scale.

As shown in FIG. 2, a sharp drop occurs at positions of the isopotential lines of the electric field inside the liquid crystal grating corresponding to the gaps 202 in the prior art, and also, a distance between two adjacent isopotential lines increases abruptly. As the tangential direction of an isopotential line is always perpendicular to that of an electric field line, density of the isopotential lines reflects electric field intensity, and therefore, directions of the electric fields at the gaps 202 may change abruptly, and intensities of the electric fields at the gaps 202 may also decrease abruptly. Thus, the electric fields inside the liquid crystal grating in the prior art do not change continuously and smoothly.

As shown in FIG. 3, the directions of the electric fields at the gaps 202 may change abruptly, and intensities of the electric fields at the gaps 202 may also decrease abruptly, which causes the phases of incident light at the gaps 202 to increase abruptly, and thus, the phase curve of incident light may bulge at positions corresponding to the gaps, for example, a portion of the phase curve corresponding to abscissa values of 3 μm to 5 μm.

From the above, in the liquid crystal grating of the prior art, the electrodes on the lower substrate are discrete, and as a result, with voltages applied to the electrodes, the electric field at the gaps between respective adjacent electrodes changes abruptly and the electric field inside the liquid crystal grating cannot varies continuously and smoothly, which further leads to that the existing liquid crystal grating fails to control the phases of incident light continuously and smoothly.

SUMMARY OF THE INVENTION

The object of the present invention is to provide a liquid crystal grating, a manufacturing method and a drive method thereof, and an optical phased array device, and the liquid crystal grating may generate continuously and smoothly changing electric field inside, and may further control the phases of incident light continuously and smoothly.

To achieve the above object, the present invention provides a liquid crystal grating comprising: an upper substrate and a lower substrate provided opposite to each other, liquid crystal filled therebetween, and a common electrode formed on the upper substrate, wherein a plurality of first electrodes are formed on the lower substrate with first gaps formed between adjacent first electrodes, second electrodes are formed above the first gaps with second gaps formed between adjacent second electrodes, and an insulation layer is provided between the first electrodes and the second electrodes.

Optionally, the first electrodes and the second electrodes have a bar-like shape.

Optionally, projections of center lines of the second gaps on the lower substrate coincide with projections of center lines of the first electrodes on the lower substrate.

Optionally, the widths of the first electrodes are larger than or equal to those of the second gaps.

Optionally, the widths of the second electrodes are larger than or equal to those of the first electrodes.

Optionally, a drive chip connected to the first electrodes and the second electrodes is further provided on the lower substrate.

Optionally, the drive chip comprises: a first drive sub-chip and a second drive sub-chip, one of which is connected to the first electrodes, and the other of which is connected to the second electrodes.

To achieve the above object, the present invention provides a manufacturing method of a liquid crystal grating, and the manufacturing method comprises the steps of: forming a common electrode on an upper substrate, forming first electrodes on a lower substrate, such that first gaps are formed between adjacent first electrodes; forming an insulation layer on the lower substrate formed with the first electrodes; forming second electrodes above the first gaps on the lower substrate formed with the insulation layer, such that second gaps are formed between adjacent second electrodes; aligning the upper substrate with the lower substrate to form a cell, and forming liquid crystal between the upper substrate and the lower substrate.

To achieve the above object, the present invention provides a drive method of a liquid crystal grating, which is any one of the above liquid crystal gratings, and the drive method comprises the steps of: applying voltages to the first electrodes and the second electrodes, respectively, so that first electric fields are formed between the first electrodes and the common electrode, and second electric fields are formed between the second electrodes and the common electrode so as to jointly drive the liquid crystal of the liquid crystal grating to rotate.

Optionally, a voltage $U_3'$ applied to the first electrode is:

$$U_3' = \left(1 + \frac{\varepsilon_{LC} d_p}{\varepsilon_p d_{LC}}\right) U_3$$

wherein, $U_3$ is a theoretical voltage on the upper surface of the insulation layer, $\varepsilon_{LC}$ is a relative dielectric constant of the liquid crystal under the action of the voltage $U_3$, $d_{LC}$ is a thickness of the liquid crystal cell, $\varepsilon_p$ is a relative dielectric constant of the insulation layer, and $d_p$ is a thickness of the insulation layer.

To achieve the above object, the present invention provides an optical phased array device comprising a liquid crystal grating which is any one of the above liquid crystal gratings.

In the liquid crystal grating, manufacturing and drive methods thereof, and the optical phased array device, the plurality of first electrodes are formed on the lower substrate with first gaps formed between adjacent first electrodes, second electrodes are further provided above the first gaps with second gaps formed between adjacent second electrodes, and the insulation layer is provided between the first electrodes and the second electrodes. When voltages are applied to the first electrodes and the second electrodes, continuously and smoothly changing electric field is generated inside the liquid crystal grating, and then phases of incident light may be controlled continuously and smoothly, which improves the ability of the liquid crystal grating to modulate light beam.

DETAILED DESCRIPTION OF THE EMBODIMENTS

To allow those skilled in the art to better understand the technical solutions of the present invention, a liquid crystal grating, manufacturing and drive methods thereof and an optical phased array device provided by embodiments of the present invention are described in detail below in conjunction with the accompanying drawings.

Figure 4:
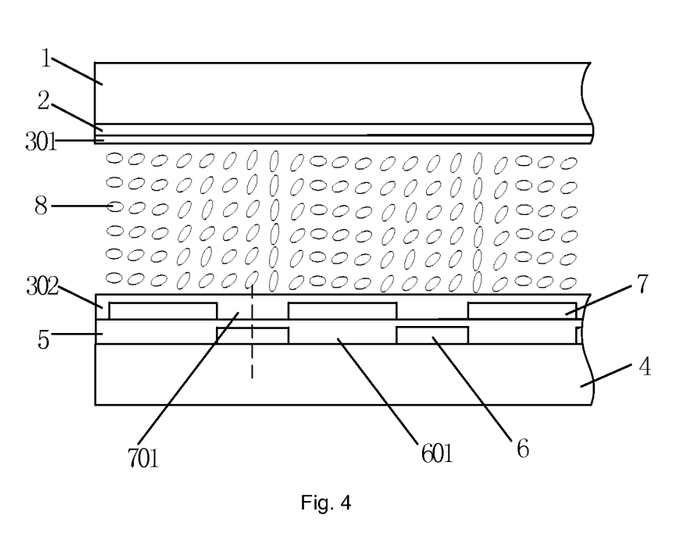
FIG. 4 is a schematic diagram of a structure of a liquid crystal grating provided by an embodiment of the present invention.

FIG. 4 is a schematic diagram of a structure of a liquid crystal grating provided by an embodiment of the present invention. As shown in FIG. 4, the liquid crystal grating includes an upper substrate 1 and a lower substrate 4 provided opposite to each other, and liquid crystal 8 filled between the upper substrate 1 and the lower substrate 4, wherein, a common electrode 2 is formed on the upper substrate 1, a plurality of first electrodes 6 are formed on the lower substrate 4 with first gaps 601 formed between adjacent first electrodes 6, second electrodes 7 are provided above the first gaps 601 with second gaps 701 formed between adjacent second electrodes 7, and an insulation layer 5 is provided between the first electrodes 6 and the second electrodes 7.

Further an alignment layer 301 may be further provided on the common electrode 2, and an alignment layer 302 may also be provided on the second electrodes.

It should be noted that, the second electrodes 7 and the first electrodes 6 form a bilayer electrode structure in the present invention; the first electrodes 6 are located below the second gaps 701, and the second electrodes 7 are located above the first gaps 601, that is, the first electrodes and the second electrodes are staggered by each other.

Further, the first electrodes 6 and the second electrodes 7 have a bar-like shape. Preferably, as shown in FIG. 4, projections of center lines of the second gaps 701 on the lower substrate 4 coincide with projections of center lines of the first electrodes 6 on the lower substrate 4. Here, the center line of the second gap 701 refers to center line which extends in the same direction as the second gap 701 (i.e., a direction perpendicular to the section shown in FIG. 4) on the plane formed by the second electrodes; similarly, the center line of the first electrode 6 refers to center lines which extends in the same direction as the first electrode (i.e., the direction perpendicular to the section shown in FIG. 4) on the plane formed by the first electrodes. The projections of the center lines of the first electrodes 6 on the lower substrate 4 coincide with those of the center lines of the second gaps 701, such that the electric fields formed between the first electrodes 6 and the common electrode 2 can better compensate for electric fields above the second gaps 701, and the electric fields inside the liquid crystal grating can vary evenly.

Further preferably, the first electrodes 6 have a width larger than or equal to those of the second gaps 701. That is, the projections of the first electrodes 6 on the lower substrate 4 totally cover the projections of the second gaps 701 on the lower substrate 4. To compensate for the electric field above the second gaps 701 optimally and to make the electric fields inside the liquid crystal grating vary evenly, widths of the first electrodes 6 may be set to be larger than or equal to those of the second gaps 701. In this condition, as the projections of the first electrodes 6 on the lower substrate 4 may overlap with the projections of the second electrodes 7 on the lower substrate 4, continuous space electric fields can be better achieved, so as to avoid problems such as dislocation due to process accuracy.

As the distance between the first electrodes 6 and the common electrode 2 is farther than that between the second electrodes 7 and the common electrode 2, the first electrodes 6 serve as auxiliary electrodes, while the second electrodes 7 serve as the primary electrodes, so as to use power effectively. Specifically, first electric fields, as auxiliary electric fields for controlling rotation of the liquid crystal 8, are formed between the first electrodes 6 and the common electrode 2, and second electric fields, as primary electric fields for controlling rotation of the liquid crystal 8, are formed between the second electrodes 7 and the common electrode 2. Further, to use power effectively, the primary electrodes have a width larger than or equal to those of the auxiliary electrodes, that is, the second electrodes 7 have a width larger than or equal to those of the first electrodes 6.

Figure 8:
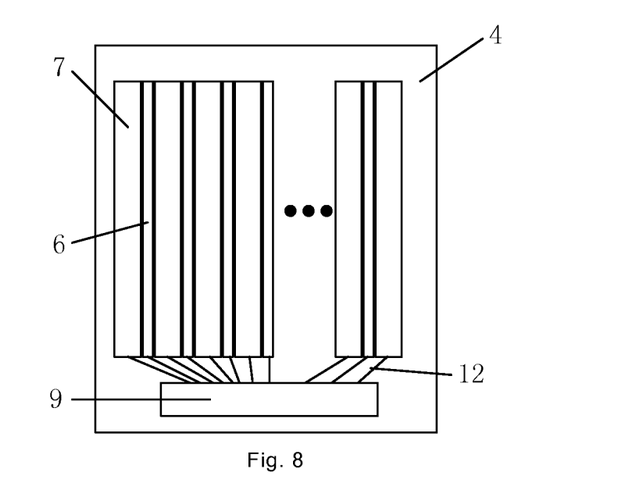
FIG. 8 is a schematic diagram illustrating a case that electrodes on a lower substrate in the liquid crystal grating provided by the embodiment of the present invention are controlled by the same drive chip.

Further, a drive chip for controlling magnitudes of voltages applied to the first electrodes 6 and the second electrodes 7 is further provided on the lower substrate 4, and the drive chip is connected to the first electrodes 6 and the second electrodes 7. For example, FIG. 8 is a schematic diagram illustrating a case that electrodes on lower substrate 4 in the liquid crystal grating provided by this embodiment are controlled by the same drive chip 9. As shown in FIG. 8, the drive chip 9 is connected to the first electrodes 6 and the second electrodes 7 via film wires 12. When an external controller receives input data, the controller and the drive chip 9 apply voltages to the first electrodes 6 and the second electrodes 7 according to the input data. The drive chip 9 is provided on the lower substrate 4, which may improve utilization of the lower substrate 4 effectively.

Figure 9:
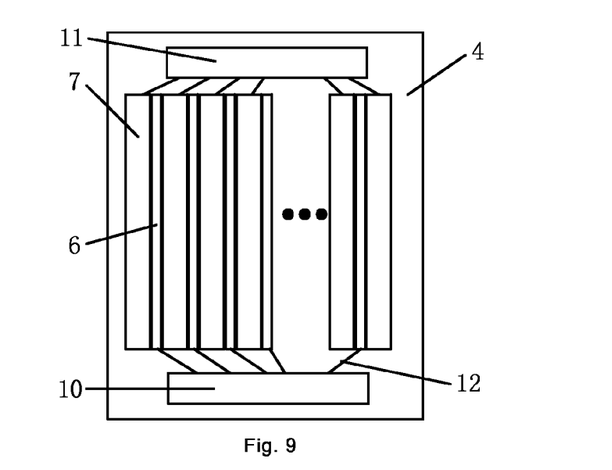
FIG. 9 is a schematic diagram illustrating a case that electrodes on the lower substrate in the liquid crystal grating provided by the embodiment of the present invention are controlled by a first drive sub-chip and a second drive sub-chip.

Alternatively, the drive chip provided on the lower substrate 4 may include a first drive sub-chip 10 and a second drive sub-chip 11, one of which is connected to the first electrodes 6, and the other is connected to the second electrodes 7. FIG. 9 is a schematic diagram illustrating a case that electrodes on the lower substrate 4 in the liquid crystal grating provided by this embodiment are controlled by the first drive sub-chip 10 and the second drive sub-chip 11. As shown in FIG. 9, the first drive sub-chip 10 is connected to the first electrodes 6 via film wires 12, and the second drive sub-chip 11 is connected to the second electrodes 7 via film wires 12. In this technical solution, the drive chip is divided into the first drive sub-chip 10 for controlling voltages applied to the first electrodes 6 and the second drive sub-chip 11 for controlling voltages applied to the second electrodes 7, and this control mode can improve control efficiency of the control chip effectively, and improve the performance of the liquid crystal grating indirectly. Of course, a plurality of (more than two) drive sub-chips may be included in the drive chip, so as to achieve the control on voltages applied to the first 6 and the second electrodes 7 by the plurality of drive sub-chips. Here, the film wires 12 may be made of any material of ITO (indium tin oxide), Mo, Al, AlNd or Cu, and the drive chip may be mounted on the lower substrate 4 by way of COG (Chip On Glass) package, COF (Chip On Film) package or TAB (Tape Automated Bonding) package.

Figure 5:
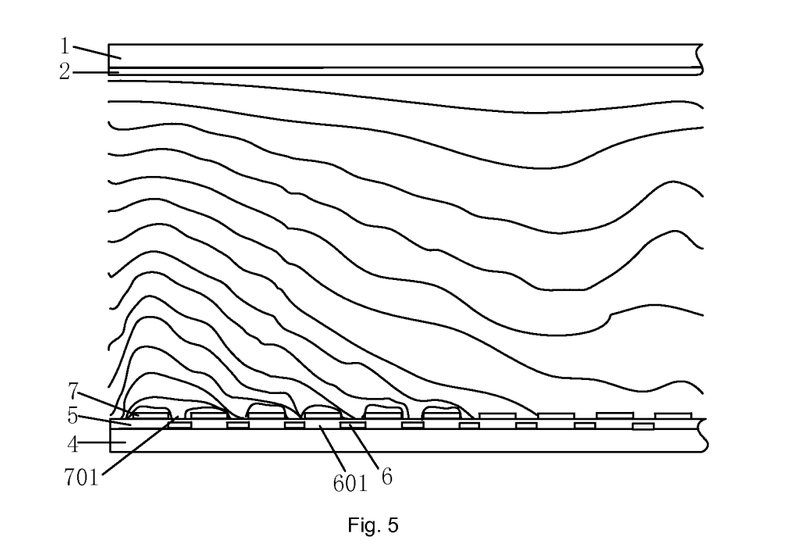
FIG. 5 is a schematic diagram of isopotential lines of electric field inside the liquid crystal grating provided by the embodiment of the present invention.
Figure 6:
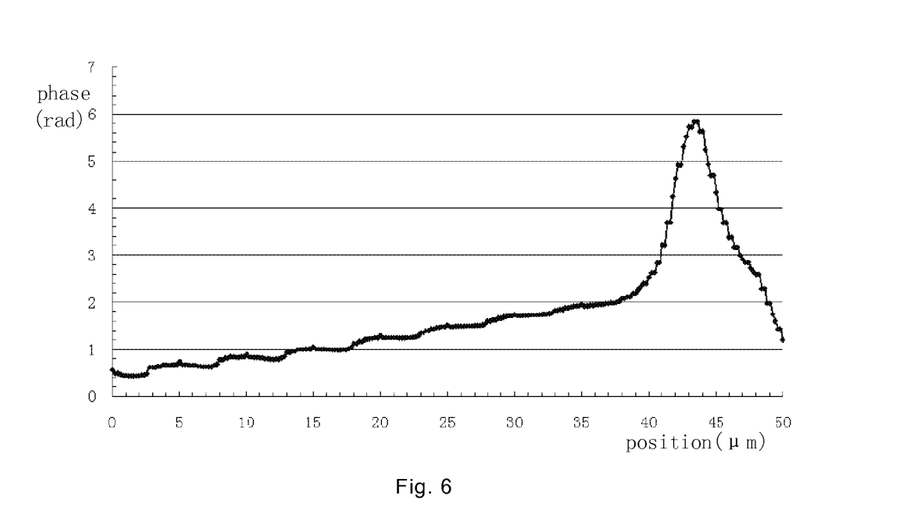
FIG. 6 is a graph illustrating phases of incident light controlled by the liquid crystal grating provided by the embodiment of the present invention.

To present the advantages of the technical solution in this embodiment of the present invention over the prior art, the electric field inside the liquid crystal grating in the embodiment of the present invention and the controlled phases of incident light are simulated. Here, the second electrodes 7 have a width of 3 µm, the second gaps 701 have a width of 2 µm, the first electrodes 6 have a width of 2 µm, the first gaps have a width of 3 µm, the liquid crystal cell has a thickness of 5 µm, and the applied voltages decrease gradually from left end to right end.

FIG. 5 is a schematic diagram of isopotential lines of electric field inside the liquid crystal grating provided by this embodiment of the present invention. As shown in FIG. 5, the isopotential lines of the electric field inside the liquid crystal grating in this embodiment of the present invention go down continuously and smoothly, and no abrupt change in distance between two adjacent isopotential lines occurs, and therefore, the electric field inside the liquid crystal grating provided by this embodiment of the present invention varies continuously and smoothly.

FIG. 6 is a graph illustrating phases of incident light controlled by the liquid crystal grating provided by this embodiment of the present invention, in which only changes in phases of incident light corresponding to a first 50 µm from left end of the liquid crystal grating are depicted. As shown in FIG. 6, the whole phase curve presents a continuous and smooth change trend, and no region with abrupt phase change appears.

In the liquid crystal grating provided by this embodiment of the present invention, a plurality of first electrodes are formed on the lower substrate with the first gaps formed between adjacent first electrodes, the second electrodes are provided above the first gaps with the second gaps formed between adjacent second electrodes, and the insulation layer is provided between the first electrodes and the second electrodes. When voltages are applied to the first electrodes and the second electrodes, continuously and smoothly changing electric field is generated inside the crystal liquid grating, and then phases of incident light may be controlled continuously and smoothly, which directly improves the ability of the liquid crystal grating to modulate light beam.

Figure 10:
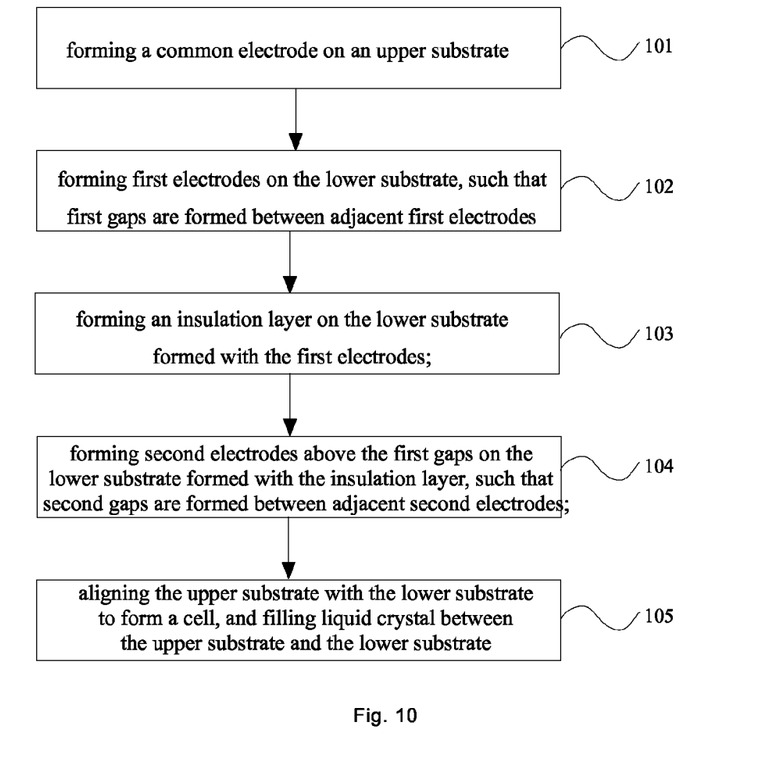
FIG. 10 is a flow diagram of a manufacturing method of a liquid crystal grating provided by another embodiment of the present invention.

FIG. 10 is a flow diagram of a manufacturing method of a liquid crystal grating provided by another embodiment of the present invention, and as shown in FIG. 10, the manufacturing method includes the steps as below.

Step 101: a common electrode is formed on an upper substrate.

Step 102: first electrodes are formed on a lower substrate with first gaps formed between adjacent first electrodes.

Step 103: an insulation layer is formed on the lower substrate formed with the first electrodes.

Step 104: on the lower substrate formed with the insulation layer, second electrodes are formed above the first gaps with second gaps formed between adjacent second electrodes.

Step 105: the upper substrate and the lower substrate are aligned to form a cell, and liquid crystal is filled between the upper substrate and the lower substrate.

Here, when forming the cell, the perimeter of the liquid crystal cell is sealed with sealant, and before injecting liquid crystal, spherical spacers are dispersed on the substrate or columnar spacers are made to maintain a unit gap of the liquid crystal cell.

It should be noted that the above step numbers are not used for limiting the execution sequence, for example, the step 101 may be executed after the steps 102, 103 or 104, as long as it finishes before the step 105.

In addition, as the methods for forming the common electrode, the first electrodes and first gaps, the insulation layer, the second electrodes and second gaps, the cell, etc., are the prior arts, and therefore are not described in detail herein.

In the manufacturing method of a liquid crystal grating provided by this embodiment of the present invention, by providing the bilayer electrode structure on the lower substrate, providing the second electrodes above the first gaps with the second gaps formed between the adjacent second electrodes, when voltages are applied to the first electrodes and the second electrodes, continuously and smoothly changing electric field is generated inside the crystal liquid grating, and then phases of incident light may be controlled continuously and smoothly, which directly improves the ability of the liquid crystal grating to modulate light beam.

An embodiment of the present invention further provides a drive method of a liquid crystal grating, which is the liquid crystal grating in the above embodiment, and the drive method comprises the step of applying voltages to the first electrodes and the second electrodes, respectively so that first electric fields are formed between the first electrodes and the common electrode and second electric fields are formed between the second electrodes and the common electrode, so as to jointly drive the liquid crystal of the liquid crystal grating to rotate.

Figure 7:
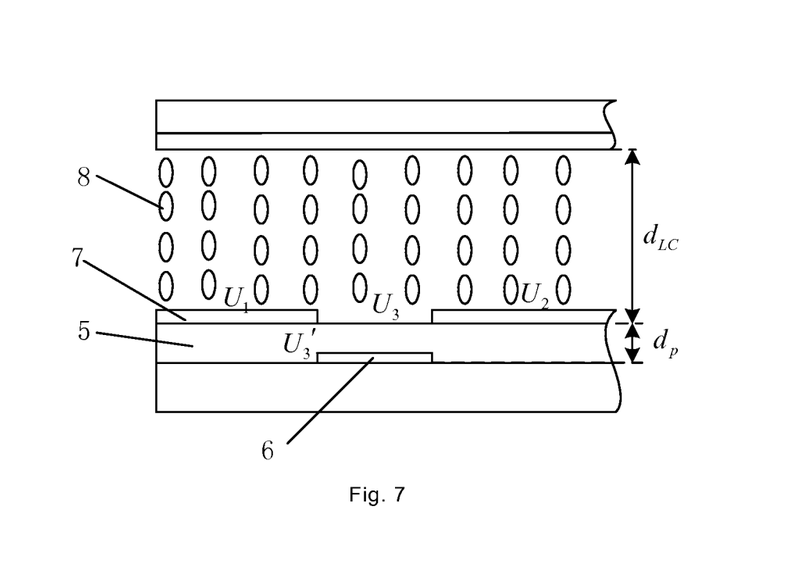
FIG. 7 is a schematic diagram illustrating electrodes of the liquid crystal grating provided by the embodiment of the present invention being applied with voltages.

Preferably, the voltage $U_3'$ applied to the first electrode 6 is:

$$U_3' = \left(1 + \frac{\varepsilon_{LC} d_p}{\varepsilon_p d_{LC}}\right) U_3$$

wherein, $U_3$ is a theoretical voltage on the upper surface of the insulation layer 5, $\varepsilon_{LC}$ is a relative dielectric constant of the liquid crystal under the action of the voltage $U_3$, $d_{LC}$ is a thickness of the liquid crystal cell, $\varepsilon_p$ is a relative dielectric constant of the insulation layer 5, and $d_p$ is a thickness of the insulation layer 5. To make those skilled in the art better understand the values of the voltage $U_3'$ applied to the first electrodes 6, detailed description will be given below.

FIG. 7 is a schematic diagram illustrating electrodes of the liquid crystal grating provided by the above embodiment of the present invention being applied with voltages. As shown in FIG. 7, voltages applied to two adjacent second electrodes 7 are $U_1$ and $U_2$, respectively, equivalent voltage of the upper surface of the insulation layer 5 above the first electrodes 6 may be calculated according to linear interpolation method, bilinear interpolation method, or the like. Here, the linear interpolation method is used for ease of calculation, then $U_3=(U_1+U_2)/2$. If the relative dielectric constant of the liquid crystal under the action of the voltage $U_3$ is $\varepsilon_{LC}$, the thickness of the liquid crystal cell is $d_{LC}$, the relative dielectric constant of the insulation layer 5 is $\varepsilon_p$, the thickness of the insulation layer 5 is $d_p$, and the common electrode provides a reference voltage (this reference voltage is set to be 0 in this embodiment), then, according to the relationship between electric field intensities at interface of two kinds of dielectrics, i.e., $\varepsilon_0 \varepsilon_{r1} E_1 \cos \alpha_1 = \varepsilon_0 \varepsilon_{r2} E_2 \cos \alpha_2$, in which $\alpha_1$ and $\alpha_2$ represent incident angle and emergence angle of the electric field at the interface of the dielectrics (e.g. the surface of the insulation layer 5 in FIG. 7), respectively and here $\alpha_1=\alpha_2=\pi/2$, as well as the relationship between voltage and electric field intensity, i.e., $U=E/d$, the following may be obtained:

$$\varepsilon_0 \varepsilon_p (U_3'-U_3)/d_p \cos \alpha_1 = \varepsilon_0 \varepsilon_{LC} U_3/d_{LC} \cos \alpha_2.$$

Further, the voltage $U_3'$ applied to the first electrode 6 may be obtained as follows:

$$U_3' = \frac{\varepsilon_p d_{LC} + \varepsilon_{LC} d_p}{\varepsilon_p d_{LC}} U_3 = \left(1 + \frac{\varepsilon_{LC} d_p}{\varepsilon_p d_{LC}}\right) U_3$$

It should be noted that the liquid crystal 8 has different relative dielectric constants under different electric field intensities, and in practical calculation, the voltages applied to the first electrodes 6 should be calculated based on the relative dielectric constant of the liquid crystal under the equivalent voltage.

In the drive method of a liquid crystal grating provided by this embodiment of the present invention, the voltages applied to the first electrodes and the second electrodes are controlled by the drive chip, and when voltages are applied to the first and second electrodes, due to the joint effect of the first electric fields and the second electric fields, continuously and smoothly changing electric field is generated inside the crystal liquid grating, and then phases of incident light may be controlled continuously and smoothly, which directly improves the ability of the liquid crystal grating to modulate light beam.

An embodiment of the present invention further provides an optical phased array device comprising a liquid crystal grating which is the liquid crystal grating in the above embodiment, its specific implementation may refer to the above embodiment, and is not elaborated herein.

In the optical phased array device provided by this embodiment of the present invention, a liquid crystal grating is employed, in which, a plurality of first electrodes are formed on the lower substrate with the first gaps formed between adjacent first electrodes, the second electrodes are provided above the first gaps with the second gaps formed between adjacent two electrodes, and the insulation layer is provided between the first electrodes and the second electrodes. When voltages are applied to the first electrodes and the second electrodes, continuously and smoothly changing electric field is generated inside the crystal liquid grating, and then phases of incident light may be controlled continuously and smoothly, which directly improves the ability of the liquid crystal grating to modulate light beam.

It should be understood that the above implementations are merely exemplary implementations used for explaining the principle of the present invention, but the present invention is not limit thereto. In the embodiments of the present invention, some technical features among the above-described technical features may be omitted to solve only part of the technical problems existing in the prior art, and furthermore, the disclosed technical features may be combined freely. For those skilled in the art, various modifications and improvements may be made without departing from the spirit and substance of the present invention, and these modifications and improvement may also be considered as the protection scope of the present invention. The protection scope of the present invention is defined by appended claims.

The invention claimed is:

1. A liquid crystal grating, comprising: an upper substrate and a lower substrate provided opposite to each other, liquid crystal filled between the upper substrate and the lower substrate, and a common electrode formed on the upper substrate, wherein, a plurality of first electrodes are formed on the lower substrate with first gaps formed between adjacent first electrodes, second electrodes are formed above the first gaps with second gaps formed between adjacent second electrodes, only an insulation layer is provided between the first electrodes and the second electrodes, the first electrodes and the second electrodes are insulated from each other without electric connection therebetween, widths of the second electrodes are larger than those of the first electrodes, and the first electrodes and the common electrode are electrically insulated from each other.

2. The liquid crystal grating of claim 1, wherein the first electrodes and the second electrodes have a bar-like shape.

3. The liquid crystal grating of claim 2, wherein projections of center lines of the second gaps on the lower substrate coincide with projections of center lines of the first electrodes on the lower substrate.

4. The liquid crystal grating of claim 1, wherein the widths of the first electrodes are larger than or equal to those of the second gaps.

5. The liquid crystal grating of claim 1, wherein a drive chip connected to the first electrodes and the second electrodes is further provided on the lower substrate.

6. The liquid crystal grating of claim 5, wherein the drive chip comprises: a first drive sub-chip and a second drive sub-chip, one of which is connected to the first electrodes, and the other of which is connected to the second electrodes.

7. A manufacturing method of a liquid crystal grating, comprising the steps of:
   forming a common electrode on an upper substrate;
   forming first electrodes on a lower substrate, such that first gaps are formed between adjacent first electrodes;
   forming only an insulation layer on the lower substrate formed with the first electrodes;
   forming second electrodes above the first gaps on the lower substrate formed with the insulation layer, such that second gaps are formed between adjacent second electrodes, the first electrodes and the second electrodes are insulated from each other without electric connection therebetween, widths of the second electrodes are larger than those of the first electrodes, and the first electrodes and the common electrode are electrically insulated from each other; and
   aligning the upper substrate with the lower substrate to form a cell, and filling liquid crystal between the upper substrate and the lower substrate.

8. An optical phased array device comprising a liquid crystal grating, wherein the liquid crystal grating comprises: an upper substrate and a lower substrate provided opposite to each other, liquid crystal filled between the upper substrate and the lower substrate, and a common electrode formed on the upper substrate, wherein, a plurality of first electrodes are formed on the lower substrate with first gaps formed between adjacent first electrodes, second electrodes are formed above the first gaps with second gaps formed between adjacent second electrodes, only an insulation layer is provided between the first electrodes and the second electrodes, the first electrodes and the second electrodes are insulated from each other without electric connection therebetween, widths of the second electrodes are larger than those of the first electrodes, and the first electrodes and the common electrode are electrically insulated from each other.

9. The optical phased array device of claim 8, wherein the first electrodes and the second electrodes have a bar-like shape.

10. The optical phased array device of claim 9, wherein projections of center lines of the second gaps on the lower substrate coincide with projections of center lines of the first electrodes on the lower substrate.

11. The optical phased array device of claim 8, wherein a drive chip connected to the first electrodes and the second electrodes is further provided on the lower substrate.

12. The optical phased array device of claim 11, wherein the drive chip comprises: a first drive sub-chip and a second drive sub-chip, one of which is connected to the first electrodes, and the other of which is connected to the second electrodes.

13. A drive method of the liquid crystal grating of claim 1, comprising:
   applying voltages to the first electrodes and the second electrodes of the liquid crystal grating, respectively, so that first electric fields are formed between the first electrodes and the common electrode and second electric fields are formed between the second electrodes and the common electrode, so as to jointly drive the liquid crystal of the liquid crystal grating to rotate.

14. The drive method of claim 13, wherein a voltage $U_3'$ applied to the first electrode is:

$$U_3' = \left(1 + \frac{\varepsilon_{LC} d_p}{\varepsilon_p d_{LC}}\right) U_3$$

wherein, $U_3$ is a theoretical voltage on the upper surface of the insulation layer, $\varepsilon_{LC}$ is a relative dielectric constant of the liquid crystal under the action of the voltage $U_3$, $d_{LC}$ is a thickness of the liquid crystal cell, $\varepsilon_p$ is a relative dielectric constant of the insulation layer, and $d_p$ is a thickness of the insulation layer.

* * * * *